(12) United States Patent
Stachura et al.

(10) Patent No.: US 8,678,460 B2
(45) Date of Patent: Mar. 25, 2014

(54) ACCESSORY ASSEMBLIES FOR VEHICLES

(75) Inventors: Jan-Michael Francis Stachura, Milan, MI (US); Toshinao Wada, Ann Arbor, MI (US)

(73) Assignees: Toyota Motor Engineering & Manufacturing North America, Inc., Erlanger, KY (US); Toyota Jidosha Kabushiki Kaisha, Toyota (JP)

( * ) Notice: Subject to any disclaimer, the term of this patent is extended or adjusted under 35 U.S.C. 154(b) by 103 days.

(21) Appl. No.: 13/271,558

(22) Filed: Oct. 12, 2011

(65) Prior Publication Data

US 2013/0049390 A1    Feb. 28, 2013

Related U.S. Application Data (60) Provisional application No. 61/526,110, filed on Aug. 22, 2011.

(51) Int. Cl.
  *B60R 13/02*        (2006.01)
  *B25G 3/18*         (2006.01)

(52) U.S. Cl.
  USPC .................... 296/24.4; 248/27.3; 296/37.8

(58) Field of Classification Search
  USPC ............... 24/297; 248/27.3, 221.11, 222.11, 248/222.12, 222.13, 225.21, 544, 911, 912; 296/1.08, 23.34, 37.1, 37.8, 37.12, 296/37.13, 37.14, 70, 146.7; 403/326, 329, 403/330
  See application file for complete search history.

(56) References Cited

U.S. PATENT DOCUMENTS

| | | | |
|---|---|---|---|
| 4,270,328 A * | 6/1981 | Page et al. ........................ 52/511 |
| 4,541,036 A * | 9/1985 | Landries et al. .............. 361/823 |
| 5,106,143 A | 4/1992 | Soeters | |
| 5,139,285 A | 8/1992 | Lasinski | |
| 5,228,742 A | 7/1993 | Johnson et al. | |
| 5,372,415 A * | 12/1994 | Tisbo et al. ................... 312/108 |
| 5,699,601 A | 12/1997 | Gilliam et al. | |
| 5,848,855 A * | 12/1998 | Roossien ...................... 403/329 |
| 5,934,730 A * | 8/1999 | Yagishita et al. ............ 296/39.1 |
| 6,029,999 A | 2/2000 | O'Day | |
| 6,239,693 B1 | 5/2001 | Benard et al. | |
| 6,318,925 B1 * | 11/2001 | Bowers et al. ................ 403/325 |
| 6,581,708 B2 | 6/2003 | Lawrence et al. | |
| 6,641,191 B1 | 11/2003 | Berger et al. | |
| 6,890,016 B2 | 5/2005 | Brancheriau | |
| 6,945,579 B2 * | 9/2005 | Peck et al. ................. 296/37.12 |
| 7,086,679 B2 | 8/2006 | Andre et al. | |
| 7,104,594 B2 | 9/2006 | Granger et al. | |
| 7,131,806 B2 * | 11/2006 | Hansen ........................... 411/41 |

(Continued)

*Primary Examiner* — Glenn Dayoan
*Assistant Examiner* — Paul Chenevert
(74) *Attorney, Agent, or Firm* — Dinsmore & Shohl LLP (57) ABSTRACT

A vehicle accessory assembly includes a housing and a vehicle accessory subassembly, including a vehicle accessory and a bezel, installed in the housing. The housing includes a side panel having at least one tab extending from a top of the side panel. The vehicle accessory includes a side wall and a guide rib extending from the side wall in a direction away from a center of the accessory. The guide rib includes a guide portion. A guide angle between the guide portion and the side wall is less than about 90°. The bezel includes a snap portion. As the vehicle accessory subassembly is installed on the housing, the tab of the side panel engages the guide portion of the guide rib such that the guide portion of the guide rib guides the tab over an outboard side of the snap portion into engagement with the receiving slot of the bezel.

19 Claims, 8 Drawing Sheets

(56) References Cited

U.S. PATENT DOCUMENTS

| | | | |
|---|---|---|---|
| 7,240,955 B2 * | 7/2007 | Twork | 296/146.7 |
| 7,410,206 B2 * | 8/2008 | Koarai | 296/187.01 |
| 7,461,436 B2 | 12/2008 | Asano | |
| 7,503,608 B1 | 3/2009 | Shahidehpour | |
| 7,686,337 B2 | 3/2010 | Myers | |
| 7,753,423 B2 * | 7/2010 | Zellner, Jr. | 296/1.08 |
| 7,802,831 B2 * | 9/2010 | Isayama et al. | 296/24.34 |
| 7,805,815 B2 | 10/2010 | Babian et al. | |
| 8,267,614 B2 * | 9/2012 | Khoe | 403/326 |
| 2002/0163216 A1 | 11/2002 | Delavalle et al. | |
| 2004/0004370 A1 | 1/2004 | Granger et al. | |
| 2009/0261613 A1 | 10/2009 | Johnson et al. | |
| 2011/0017742 A1 | 1/2011 | Sausen et al. | |
| 2011/0025084 A1 | 2/2011 | LaNore et al. | |

* cited by examiner

ACCESSORY ASSEMBLIES FOR VEHICLES

CROSS REFERENCE TO RELATED APPLICATIONS

This application claims the benefit of U.S. Provisional Application No. 61/526,110, entitled "Accessory Assemblies for Vehicles," filed Aug. 22, 2011, the entirety of which is hereby incorporated by reference. This application is related to U.S. patent application Ser. No. 13/271,601, filed Oct. 12, 2011 and entitled "Bezels For Vehicle Accessory Assemblies And Vehicle Accessory Assemblies Comprising The Same."

TECHNICAL FIELD

The embodiments described herein generally relate to accessory assemblies for vehicles, and more specifically, to accessory assemblies for vehicles comprising a guide rib.

BACKGROUND

Vehicles may contain accessory assemblies. A vehicle accessory assembly (e.g., a console, an instrument panel, or the like) may comprise an accessory, such as a receptacle (e.g., a cup holder), a trim panel (e.g., a bezel), and support panels (e.g., console side panels). The alignment of vehicle accessory assembly components during assembly of the components may be important to obtain a desired fit and finish. Existing vehicle accessory assemblies may allow vehicle accessory assembly components to be improperly assembled, which may result in an undesirable fit and finish. This requires additional vehicle accessory assembly inspections and corrections to improperly assembled vehicle accessory assemblies, both of which lead to increased manufacturing costs.

Accordingly, a need exists for alternative accessory assemblies for vehicles.

SUMMARY

In one embodiment, a vehicle accessory assembly includes a housing and a vehicle accessory subassembly installed in the housing. The housing includes a side panel having at least one tab extending from a top of the side panel. The vehicle accessory subassembly includes a bezel and a vehicle accessory installed in the bezel. The vehicle accessory includes a side wall and a guide rib extending from the side wall in a direction away from a center of the accessory. The guide rib includes a guide portion. A guide angle between the guide portion and the side wall is less than about 90°. The bezel includes a body portion, a perimeter wall extending from an underside of the body portion, an upper engagement portion extending in an inboard direction from an inboard side of the perimeter wall, and a snap portion, at least a portion of which is spaced apart from the upper engagement portion by a receiving slot. As the vehicle accessory subassembly is installed on the housing, the tab of the side panel engages the guide portion of the guide rib such that the guide portion of the guide rib guides the tab over an outboard side of the snap portion and into engagement with the receiving slot of the bezel.

In another embodiment, a vehicle console includes a console housing and a receptacle subassembly installed in the housing. The console housing includes a side panel having at least one tab extending from a top of the side panel. The receptacle subassembly includes a bezel and a receptacle installed in the bezel. The receptacle includes a side wall and a guide rib extending from the side wall in a direction away from a center of the receptacle. The guide rib includes a guide portion. A guide angle between the guide portion and the side wall is less than about 90°. The bezel includes a body portion, a perimeter wall extending from an underside of the body portion, an upper engagement portion extending in an inboard direction from an inboard side of the perimeter wall, and a snap portion, at least a portion of which is spaced apart from the upper engagement portion by a receiving slot. As the receptacle subassembly is installed on the console housing, the tab of the side panel engages the guide portion of the guide rib such that the guide portion of the guide rib guides the tab over an outboard side of the snap portion and into engagement with the receiving slot of the bezel.

In yet another embodiment, a method of assembling a vehicle accessory assembly includes providing a housing and providing a vehicle accessory subassembly. The housing includes a side panel having at least one tab extending from a top of the side panel. The vehicle accessory subassembly includes a bezel and a vehicle accessory installed in the bezel. The vehicle accessory includes a side wall and a guide rib extending from the side wall in a direction away from a center of the accessory. The guide rib includes a guide portion. A guide angle between the guide portion and the side wall is less than about 90°. The bezel includes a body portion, a perimeter wall extending from an underside of the body portion, an upper engagement portion extending in an inboard direction from an inboard side of the perimeter wall, and a snap portion, at least a portion of which is spaced apart from the upper engagement portion by a receiving slot. The method further includes positioning the vehicle accessory subassembly over the housing, engaging the tab of the side panel with the guide portion of the vehicle accessory, and applying force to the vehicle accessory subassembly such that the guide portion of the vehicle accessory guides the tab over an outboard side of the snap portion and into engagement with the receiving slot of the bezel.

DETAILED DESCRIPTION OF THE DRAWINGS

Figure 5:
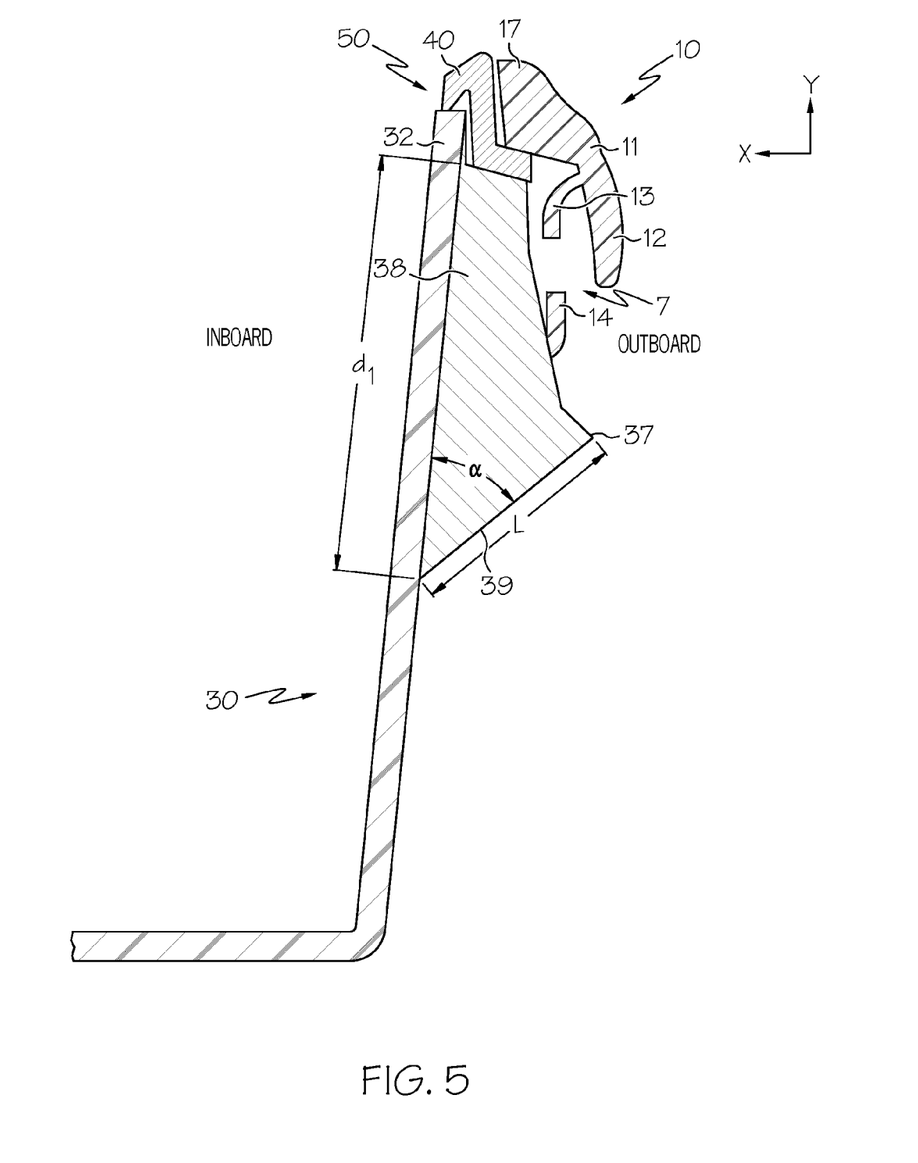
FIG. 5 schematically depicts a partial cross section of an assembled vehicle accessory subassembly comprising a bezel, a trim ring, and a vehicle accessory with a guide rib, according to one or more embodiments shown and described herein.

FIG. 5 generally depicts a cross section of a vehicle accessory subassembly comprising a vehicle accessory with a guide rib for preventing misalignment of the vehicle accessory subassembly with a corresponding housing. The vehicle accessory subassembly comprises a vehicle accessory and a bezel in which the vehicle accessory is installed. The vehicle accessory comprises a side wall and a guide rib. The guide rib extends from the side wall in a direction away from a center of the vehicle accessory. The guide rib comprises a guide portion. A guide angle between the guide portion and the side wall is less than about 90°. The bezel generally comprises a body portion, a perimeter wall, an upper engagement portion, and a snap portion. The perimeter wall extends from an underside of the body portion. The upper engagement portion extends in an inboard direction from an inboard side of the perimeter wall. At least a portion of the snap portion is spaced apart from the engagement portion by a receiving slot. The side panel generally comprises a tab extending from the top of the side panel. As the vehicle accessory subassembly is installed on the side panel, the tab of the side panel engages the guide portion of the guide rib such that the guide portion of the guide rib guides the tab over an outboard side of the snap portion and into engagement with the receiving slot of the bezel. The various components of vehicle accessory assemblies and methods for assembling vehicle accessory assemblies will be described in more detail herein with specific reference to the corresponding drawings.

Coordinate axes are included in the drawings in order to provide a frame of reference for various components of the vehicle accessory assemblies. As used herein, "above" is defined as the positive y direction of the coordinate axes shown in the drawings. "Below" is defined as the negative y direction of the coordinate axes shown in the drawings. "Inboard" is defined as the positive x direction of the coordinate axes shown in the drawings. "Outboard" is defined as the negative x direction of the coordinate axes shown in the drawings. "Forward" is defined as the positive z direction of the coordinate axes shown in the drawings. "Rear" is defined as the negative z direction of the coordinate axes shown in the drawings.

Vehicle accessory assemblies (e.g., vehicle consoles, instrument panels, or the like) may comprise a vehicle accessory, such as a receptacle (e.g., a cup holder), a trim panel (e.g., a bezel), and a housing comprising support panels (e.g., a console housing comprising console side panels or an instrument panel comprising apertures for receiving instruments). Such vehicle accessory assemblies may be assembled by snapping together the components of the vehicle accessory assembly. While the embodiments described herein are described in reference to a vehicle accessory assembly comprising a bezel, a receptacle, and a console side panel, embodiments are not limited thereto. For example, in some embodiments, a vehicle accessory assembly may comprise a receptacle other than a cup holder or an accessory other than a receptacle. In some embodiments a vehicle accessory assembly may comprise a trim panel other than a bezel. Further, in some embodiments a vehicle accessory assembly may comprise support panels other than console side panels. In other embodiments, a vehicle accessory assembly may comprise only a receptacle and a trim panel.

Figure 1:
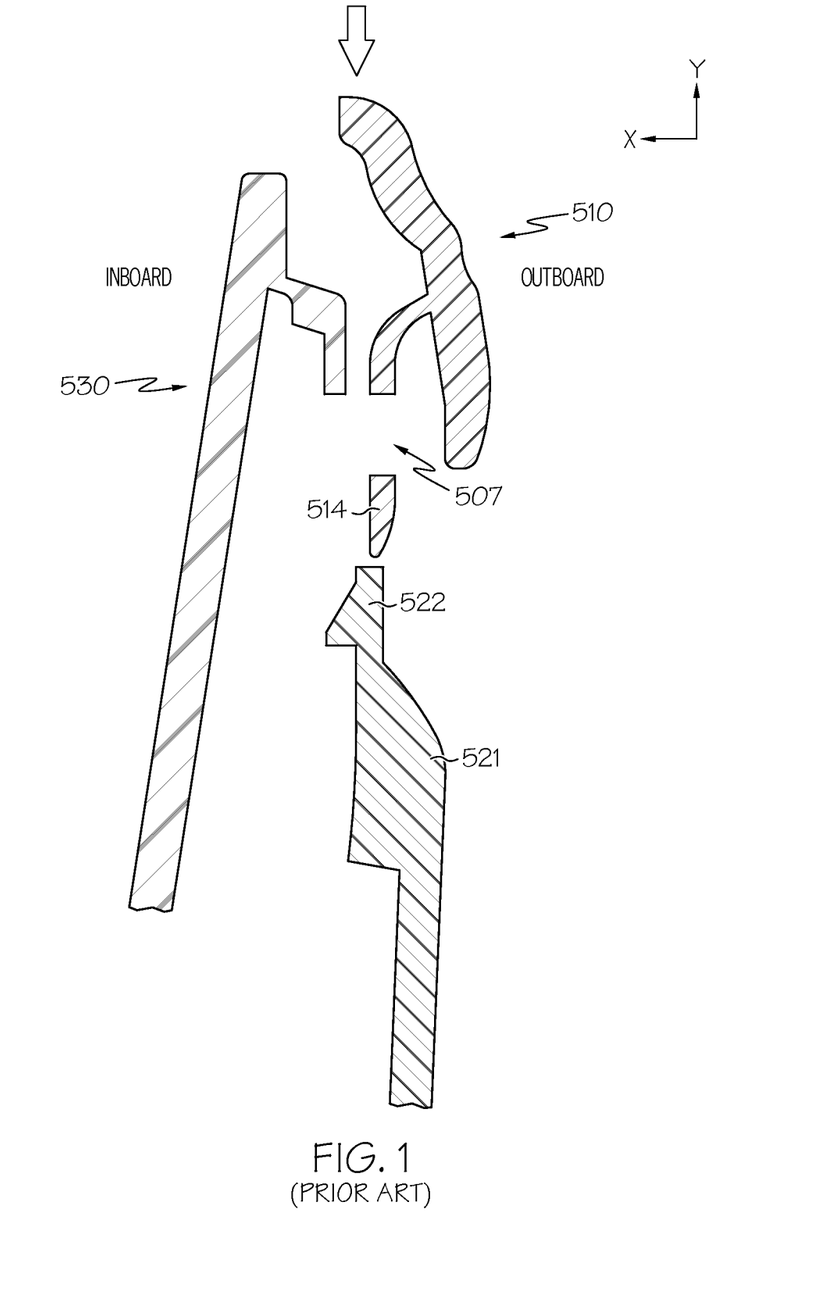
FIG. 1 (prior art) schematically depicts a partial cross section of a conventional vehicle accessory subassembly and a side panel when the conventional vehicle accessory subassembly is in a pre-assembly position with respect to the side panel.

Referring now to FIG. 1 (prior art), a partial cross section of a side panel 521 and a conventional vehicle accessory subassembly, when the conventional vehicle accessory subassembly is in a pre-assembly position with respect to the side panel 521, is schematically depicted. The conventional vehicle accessory subassembly comprises a conventional vehicle accessory 530 and a bezel 510. The bezel 510 comprises a snap portion 514 and a receiving slot 507. The side panel 521 comprises a tab 522 extending from a top of the side panel 521. In a pre-assembly position, the tab 522 of the side panel 521 is positioned beneath the snap portion 514 of the bezel 510.

Figure 2:
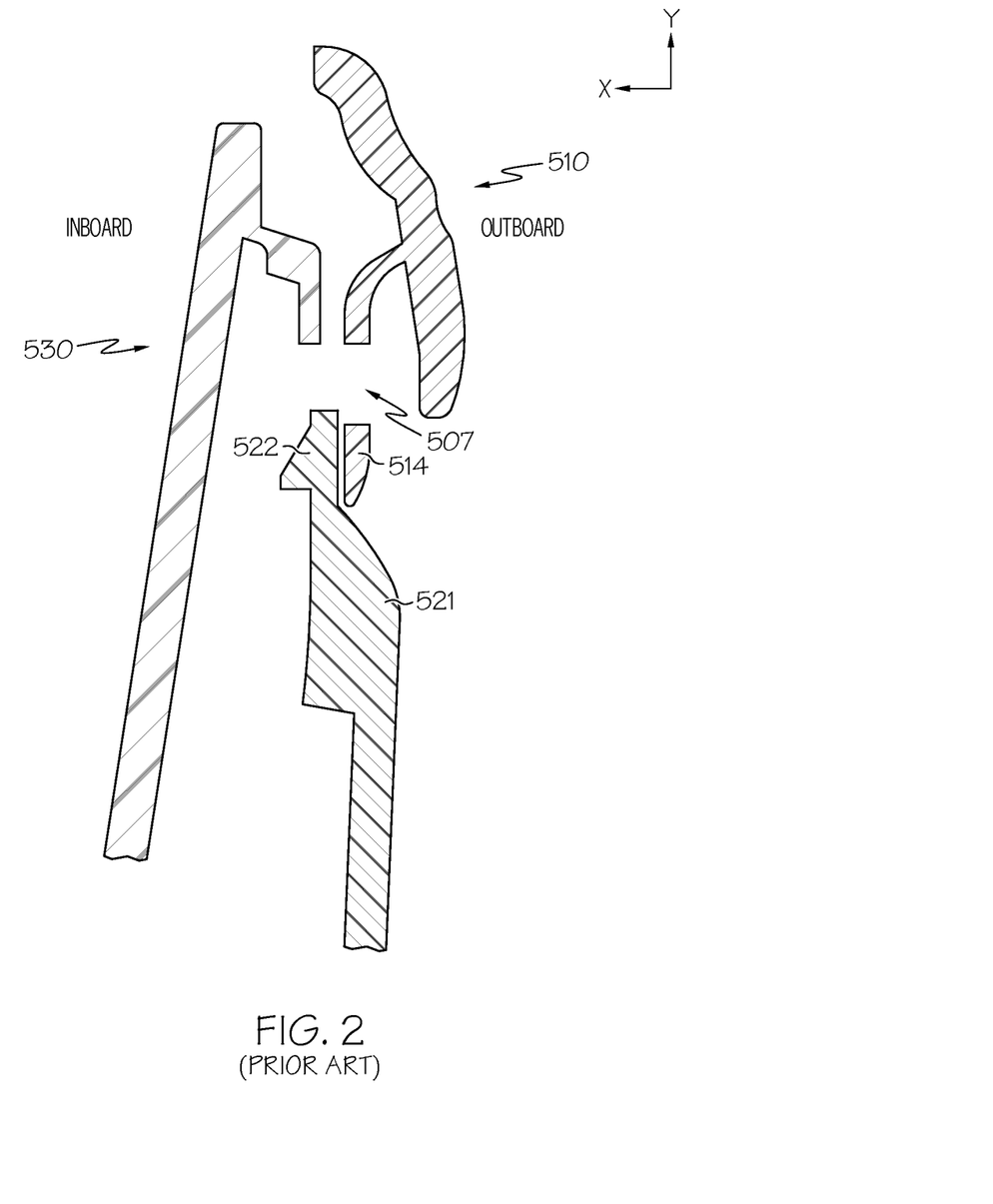
FIG. 2 (prior art) schematically depicts a partial cross section of a conventional vehicle accessory subassembly and a side panel when the vehicle accessory subassembly and the side panel are improperly assembled.

In order to assemble the conventional vehicle accessory subassembly and the side panel 521, the conventional vehicle accessory subassembly is lowered onto the side panel 521, such that the tab 522 of the side panel 521 engages the bottom of the snap portion 514. Due to material characteristics and/or manufacturing tolerances, the side panel 521 may be pushed to the inboard side of the snap portion 514 of the bezel 510 as the conventional vehicle accessory subassembly and the side panel 521 are assembled together. This may result in the conventional vehicle accessory subassembly and the side panel 521 being assembled incorrectly and with improper alignment, as depicted in FIG. 2 (prior art). The embodiments described herein are directed to vehicle accessory assemblies comprising vehicle accessories with guide ribs that mitigate the misalignment condition depicted in FIG. 2.

Figure 3:
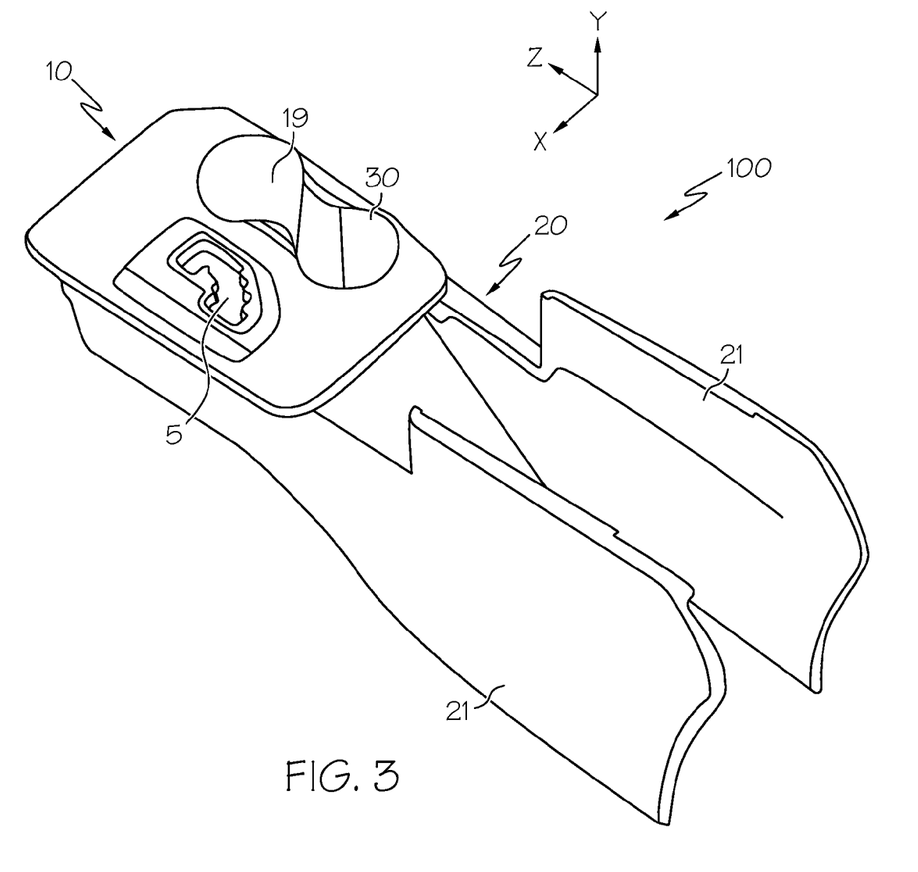
FIG. 3 schematically depicts a perspective view of a vehicle accessory assembly comprising a vehicle accessory and a bezel installed on side panels of a housing, according to one or more embodiments shown and described herein.

Referring now to FIG. 3, a perspective view of a vehicle accessory assembly 100 is schematically depicted. The vehicle accessory assembly 100 generally comprises a vehicle accessory 30 and a bezel 10 installed on side panels 21 of a housing 20. While the vehicle accessory assembly 100 is schematically depicted in FIG. 3 as a vehicle console, it should be understood that other embodiments include vehicle accessory assemblies other than vehicle consoles, such as, for example, instrument panels, instrument clusters, or the like.

Figure 4:
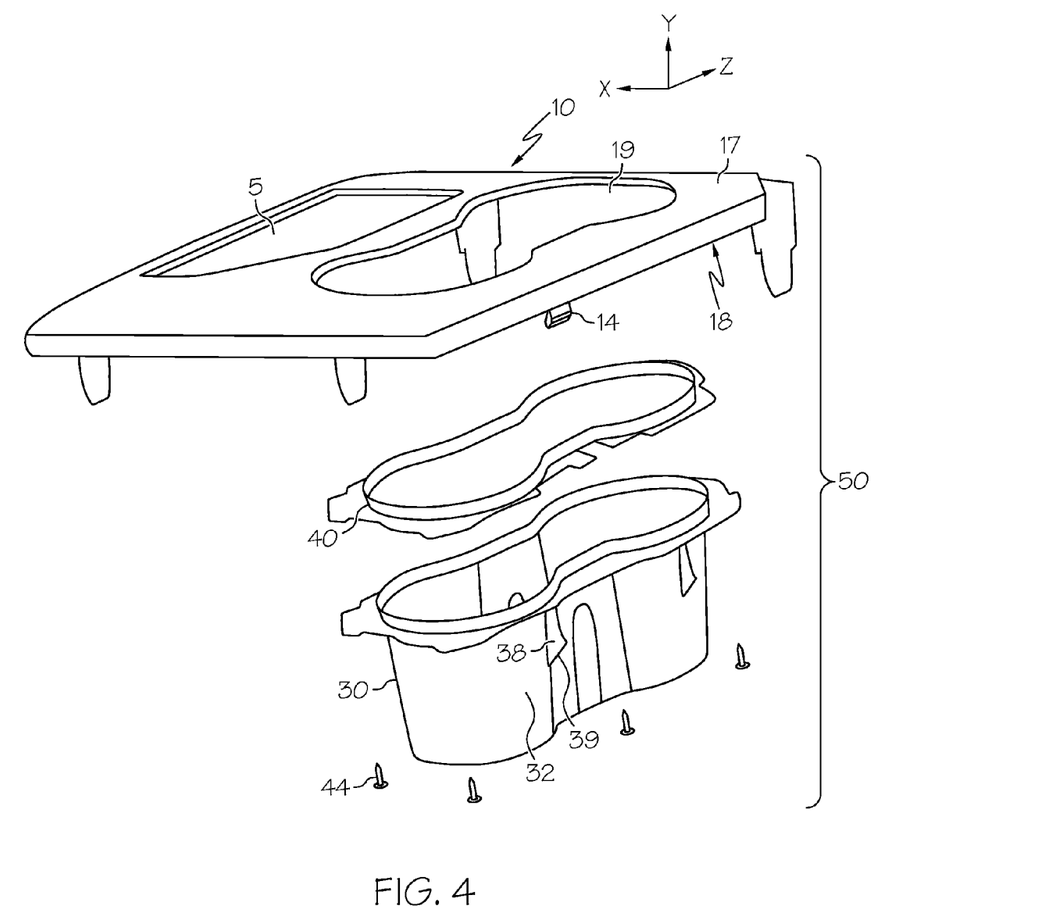
FIG. 4 schematically depicts an exploded view of a vehicle accessory subassembly comprising a bezel, a trim ring, and a vehicle accessory comprising a guide rib, according to one or more embodiments shown and described herein.

Referring now to FIG. 4, a vehicle accessory subassembly 50 comprising a bezel 10, an optional trim ring 40, and a vehicle accessory 30 comprising a guide rib 38 is schematically depicted. The bezel 10 comprises a body portion 17, an underside 18, a snap portion 14, a gear shift opening 5 through which a gear shift may protrude, and an accessory opening 19 for receiving a corresponding vehicle accessory. The vehicle accessory 30 received by the accessory opening 19 in the bezel 10 is a receptacle (e.g., one or more cup holders).

The bezel 10 is formed from a first material. The first material may comprise metal, plastic, or composite materials. In the embodiments shown and described herein, the bezel 10 is formed by injection molding acrylonitrile butadiene styrene ("ABS") or a polycarbonate material. However, it should be understood that other materials and other forming processes can be used to construct the bezel 10. In some embodiments, the bezel 10 is formed as a unitary piece, while, in other embodiments, the bezel 10 comprises multiple pieces.

Still referring to FIG. 4, the trim ring 40 has an opening for receiving a corresponding vehicle accessory. The trim ring 40 is formed from metal, plastic, or composite materials. In the embodiments shown and described herein, the trim ring 40 is formed by injection molding acrylonitrile butadiene styrene ("ABS") or a polycarbonate material. However, it should be understood that other materials and other forming processes can be used to construct the trim ring 40. In some embodiments, the trim ring 40 is formed as a unitary piece, while, in other embodiments, the trim ring 40 comprises multiple pieces. Further, while the trim ring 40 is described herein as being formed from the same material from which the bezel 10 is formed, it should be understood that the trim ring 40 and the bezel 10 can be formed from different materials.

Still referring to FIG. 4, the vehicle accessory 30 comprises a side wall 32 and a guide rib 38 extending from the side wall 32 in a direction away from the center of the vehicle accessory 30. The guide rib 38 is generally wedge-shaped and comprises a guide portion 39 extending from the side wall 32 at an angle with respect to the side wall 32. While the vehicle accessory 30 is depicted as including two guide ribs 38, in other embodiments, the vehicle accessory 30 may include only one guide rib 38. In still other embodiments, the vehicle accessory 30 may include three or more guide ribs 38.

The vehicle accessory 30 is formed from metal, plastic, or composite materials. In the embodiments shown and described herein, the vehicle accessory 30 is formed by injection molding polypropylene. However, it should be understood that other materials and other forming processes can be used to construct the vehicle accessory 30. In some embodiments, the vehicle accessory 30 is formed as a unitary piece, while, in other embodiments, the vehicle accessory 30 comprises multiple pieces.

Still referring to FIG. 4, the vehicle accessory subassembly is assembled by positioning the trim ring 40 on top of the vehicle accessory 30 so that the opening of the trim ring 40 is in alignment with the vehicle accessory 30 and so that the screw holes in the trim ring 40 and the vehicle accessory 30 are in alignment. The bezel 10 is positioned over the trim ring 40 so that the accessory opening 19 of the bezel 10 is positioned over the opening of the trim ring 40 and the vehicle accessory 30 and so that the screw holes in the bezel 10 and the vehicle accessory 30 are in alignment. The bezel 10, the trim ring 40, and the vehicle accessory 30 are fastened together to form a vehicle accessory subassembly 50 using the screws 44, which fasten the bezel 10, the trim ring 40, and the vehicle accessory 30 when installed. In other embodiments, the bezel 10, the trim ring 40, and the vehicle accessory 30 may be bonded with an adhesive or may be mechanically fastened with clips or snap tabs. While some embodiments include the trim ring 40, other embodiments lack the trim ring 40.

Referring now to FIG. 5, a partial cross section of an assembled vehicle accessory subassembly 50 comprising a bezel 10, a trim ring 40, and a vehicle accessory 30 with a guide rib 38 is schematically depicted. The cross section schematically depicted in FIG. 5 is taken at the guide rib 38 of the vehicle accessory subassembly 50 of FIG. 4 when the vehicle accessory subassembly 50 is assembled. As depicted in FIG. 5, the trim ring 40 is positioned between the bezel 10 and the vehicle accessory 30.

Still referring to FIG. 5, the bezel 10 generally comprises a body portion 17, a perimeter wall 11, an overhang portion 12, an upper engagement portion 13, and a snap portion 14. The perimeter wall 11 extends from an underside of the body portion 17. The overhang portion 12 extends from the perimeter wall 11 in a direction substantially parallel to the perimeter wall 11. While the bezel 10 is depicted as comprising the overhang portion 12 in FIG. 5, in some embodiments, the bezel 10 may be constructed without the overhang portion 12. The upper engagement portion 13 extends in an inboard direction from an inboard side of the perimeter wall 11. At least a portion of the snap portion 14 is spaced apart from the upper engagement portion 13 by a receiving slot 7.

Still referring to FIG. 5, the center of the vehicle accessory 30 is located on the inboard side of the side wall 32. A length $d_1$ of the portion of the side of the guide rib 38 that extends along the side wall 32 of the vehicle accessory 30 is about 43 mm. However, it should be understood that the length $d_1$ may have other dimensions. Further, while the embodiment depicted in FIG. 5 comprises a guide rib 38 extending from an upper portion of the side wall 32, in other embodiments, the guide rib 38 may extend from the middle of the side wall 32, the lower portion of the side wall 32, or along the entire side wall 32. In addition, while the guide rib 38 contacts the snap portion 14 in the embodiment depicted in FIG. 5, in other embodiments, the guide rib 38 is spaced apart from the snap portion 14.

Still referring to FIG. 5, the guide rib 38 of the vehicle accessory 30 comprises a guide portion 39. A guide angle α is formed between the guide portion 39 and the side wall 32. In some embodiments, the guide angle α satisfies the relation $0° < α < 90°$. In one embodiment, the guide angle α is about 45°. However, it should be understood that other guide angles may also be possible. In the embodiment depicted in FIG. 5, a length L of the guide portion 39 is about 25 mm. However, it should be understood that the guide portion 39 may be formed with other lengths.

Still referring to FIG. 5, a free end 37 of the guide portion 39 is positioned outboard of the snap portion 14 of the bezel 10 when the vehicle accessory subassembly 50 is assembled. However, it should be understood that in other embodiments, the free end 37 of the guide portion 39 may be positioned inboard of the snap portion 14 of the bezel 10. In the embodiment depicted in FIG. 5, the free end 37 of the guide portion 39 is positioned below the snap portion 14 of the bezel 10 when the vehicle accessory subassembly 50 is assembled. However, it should be understood that in other embodiments, the free end 37 of the guide portion 39 may be positioned substantially even with the snap portion 14.

Figure 6:
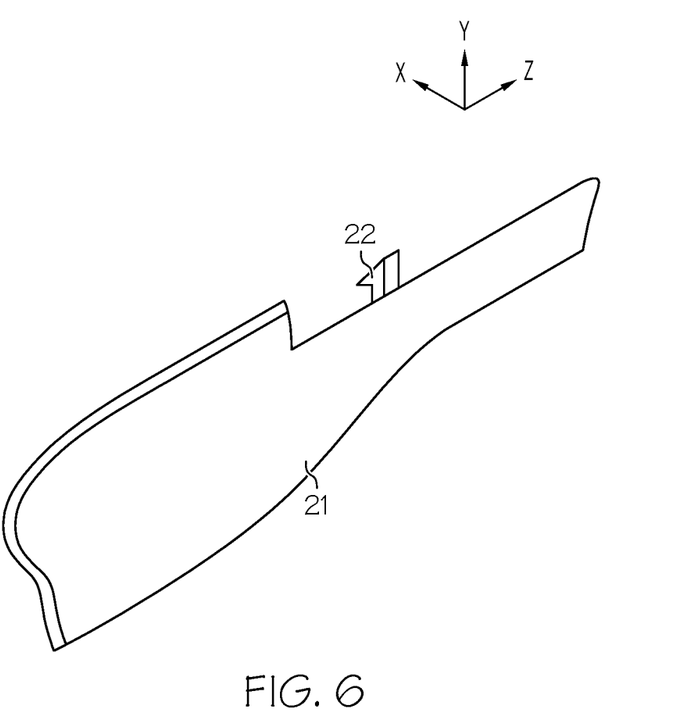
FIG. 6 schematically depicts a perspective view of a side panel of a housing comprising a tab extending from the top of the side panel, according to one or more embodiments shown and described herein.

Referring now to FIG. 6, a perspective view of a side panel 21 of a housing is schematically depicted. A tab 22 extends from the top of the side panel 21. The tab 22 facilitates securing the side panel 21 and the vehicle accessory subassembly 50 to one another. Specifically, as the vehicle accessory subassembly 50 of FIG. 4 is installed on the housing 20 of FIG. 3, the tab 22 of the side panel 21, depicted in FIG. 6, engages the corresponding receiving slot 7 in the bezel 10 of the vehicle accessory subassembly 50, thereby coupling the vehicle accessory subassembly 50 to the side panel 21. While the side panel 21 is schematically depicted as including only one tab 22 extending from the top of the side panel 21, multiple tabs may extend from the top of the side panel 21. Each tab extending from the top of side panel 21 may correspond to a matching receiving slot of the bezel 10 such that each tab engages the corresponding receiving slot when the vehicle accessory subassembly 50 and the side panel 21 are assembled.

In the embodiment described herein, the side panel 21 is formed from a second material different than the first material from which the bezel 10 is formed. The second material may comprise metal, plastic, or composite materials. The second material from which the side panel 21 is formed is more flexible than the first material from which the bezel 10 is formed. In the embodiments shown and described herein, the side panel 21 is formed by injection molding polypropylene. Polypropylene is more flexible than the ABS material from which the bezel 10 is formed. However, it should be understood that other materials and other forming processes can be used to construct the side panel 21. In some embodiments, the side panel 21 is formed as a unitary piece such as when the side panel 21 is injection molded. In other embodiments, the side panels 21 may each comprise multiple pieces. Further, while the side panel 21 is described herein as being formed from a second material different than the first material from which the bezel 10 is formed, it should be understood that the side panel 21 and the bezel 10 can be formed from the same material. In addition, while the side panel 21 is described herein as being formed from the same material as the material from which the vehicle accessory 30 is formed, in other embodiments, the side panel 21 and the vehicle accessory 30 can be formed from different materials.

Figure 7:
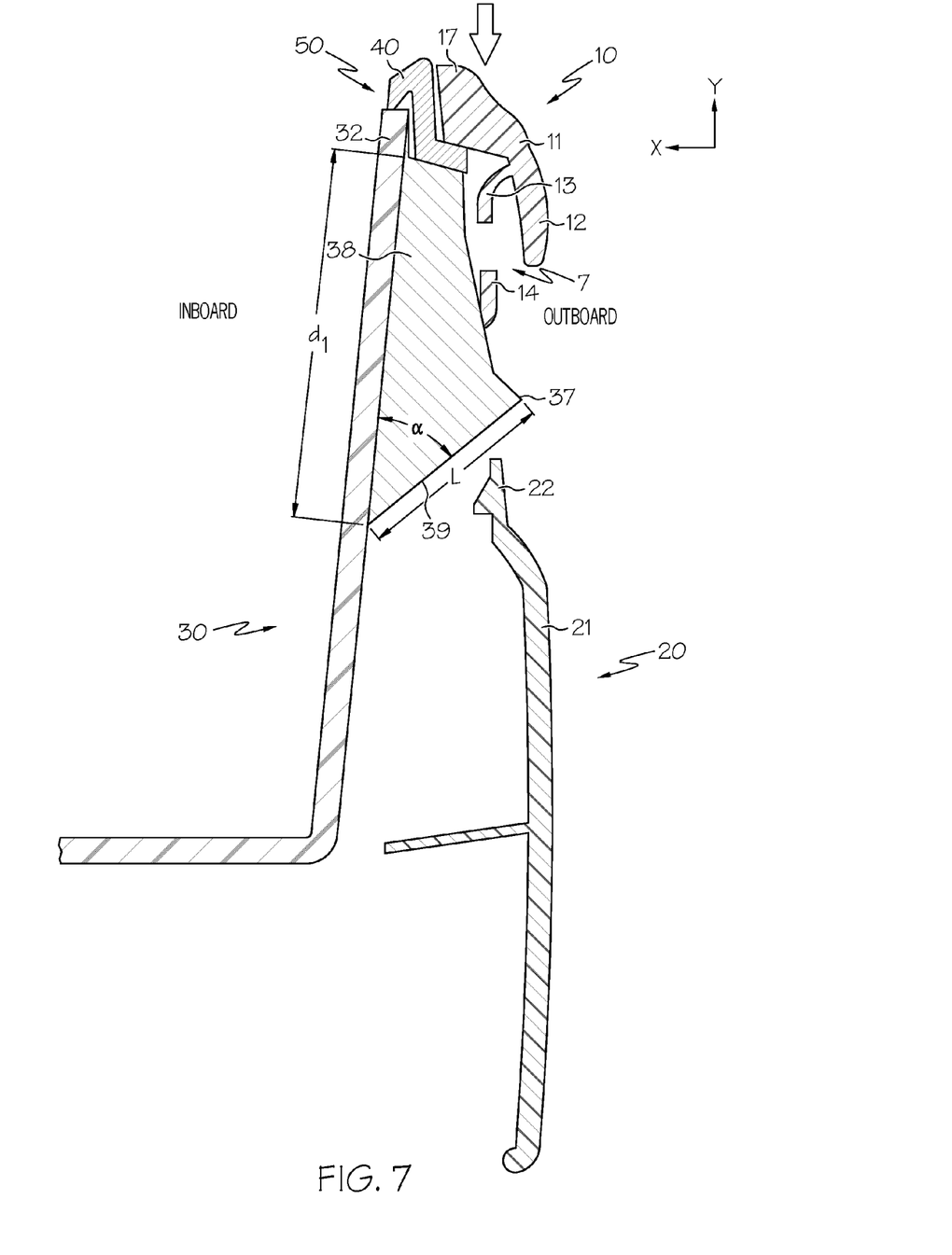
FIG. 7 schematically depicts a partial cross section of a vehicle accessory subassembly and a side panel when the vehicle accessory subassembly is in a pre-assembly position with respect to the side panel, according to one or more embodiments shown and described herein.

Referring now to FIG. 7, the vehicle accessory subassembly 50 comprising the bezel 10 and the vehicle accessory 30 is assembled to the side panel 21 by sliding the vehicle accessory subassembly 50 down onto the side panel 21 so that the bezel 10 and the side panel 21 are mechanically fastened such that the tab 22 of the side panel 21 engages the receiving slot 7 of the bezel 10. Specifically, FIG. 7 shows a partial cross section of the vehicle accessory subassembly 50 and the side panel 21 when the vehicle accessory subassembly 50 is in a pre-assembly position over the side panel 21.

During assembly, the vehicle accessory subassembly 50 is lowered onto the side panel 21 such that the tab 22 of the side panel 21 engages the guide portion 39 of the vehicle accessory 30. Force is then applied to the vehicle accessory subassembly 50 to engage the tab 22 of the side panel 21 with the guide portion 39 of the vehicle accessory 30 such that the guide portion 39 guides the tab 22 to the outboard side of the snap portion 14 and into engagement with the receiving slot 7 of the bezel 10.

Figure 8:
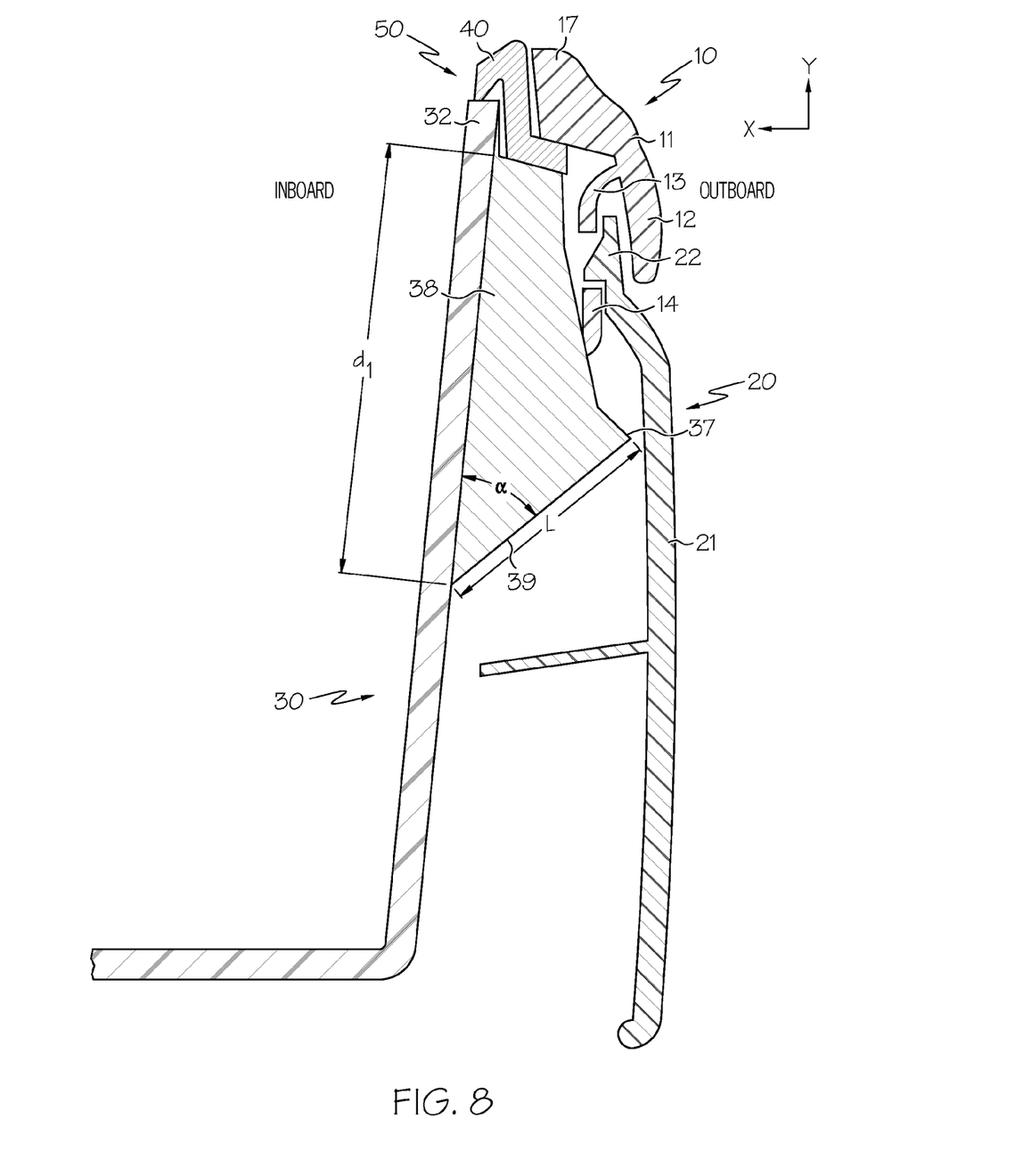
FIG. 8 schematically depicts a partial cross section of a vehicle accessory subassembly and a side panel when the vehicle accessory subassembly and the side panel are assembled, according to one or more embodiments shown and described herein.

Referring now to FIG. 8, a partial cross section of the vehicle accessory subassembly 50 assembled onto the side panel 21 is schematically depicted. As shown in FIG. 8, the tab 22 of the side panel 21 is positioned above the snap portion 14 and below the upper engagement portion 13 of the bezel 10 such that the tab 22 engages the receiving slot 7 of the bezel 10. Accordingly, by guiding the tab 22 of the side panel 21 to the outboard side of the snap portion 14 of the bezel 10 and into alignment with the receiving slot 7 of the bezel 10, the guide portion 39 of the vehicle accessory 30 prevents the vehicle accessory subassembly 50 from being misaligned on the side panel 21.

It should now be understood that the vehicle accessory comprising a guide rib described herein prevents a tab of a console side panel from being positioned on the wrong side of a snap portion of a bezel when a vehicle accessory subassembly and the console side panel are assembled, thereby increasing the likelihood that when the console side panel and the vehicle accessory subassembly are assembled, the tab will slide to the proper side of the snap portion so that the tab of the console side panel engages the receiving slot bezel.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle accessory assembly comprising:
a housing comprising a side panel having at least one tab extending from a top of the side panel; and
a vehicle accessory subassembly installed in the housing, the vehicle accessory subassembly comprising:
a vehicle accessory comprising a side wall and a guide rib extending from the side wall in a direction away from a center of the accessory, the guide rib comprising a guide portion, wherein a guide angle between the guide portion and the side wall is less than about 90°; and
a bezel in which the vehicle accessory is installed, the bezel comprising a body portion, a perimeter wall extending from an underside of the body portion, an upper engagement portion extending in an inboard direction from an inboard side of the perimeter wall, and a snap portion, at least a portion of which is spaced apart from the upper engagement portion by a receiving slot, wherein a free end of the guide portion of the vehicle accessory is outboard of the snap portion of the bezel when the vehicle accessory and the bezel are assembled as the vehicle accessory subassembly, wherein, as the vehicle accessory subassembly is installed on the housing, the tab of the side panel engages the guide portion of the guide rib such that the guide portion of the guide rib guides the tab over an outboard side of the snap portion and into engagement with the receiving slot of the bezel.

2. The vehicle accessory assembly of claim 1 wherein the vehicle accessory is a receptacle.

3. The vehicle accessory assembly of claim 1 wherein the vehicle accessory is formed from a material selected from the group consisting of: metals, plastics, and composite materials.

4. The vehicle accessory assembly of claim 1 wherein the vehicle accessory is formed from polypropylene.

5. The vehicle accessory assembly of claim 1 wherein the vehicle accessory is formed by injection molding.

6. The vehicle accessory assembly of claim 1 wherein the guide angle is about 45°.

7. The vehicle accessory assembly of claim 1 wherein the vehicle accessory assembly is a console.

8. The vehicle accessory assembly of claim 1 wherein the guide rib of the vehicle accessory contacts the snap portion of the bezel when the vehicle accessory and the bezel are assembled as the vehicle accessory subassembly.

9. The vehicle accessory assembly of claim 1 wherein the guide portion of the vehicle accessory is positioned beneath the snap portion of the bezel when the vehicle accessory and the bezel are assembled as the vehicle accessory subassembly.

10. The vehicle accessory assembly of claim 1 wherein a length L of the guide portion is about 25 mm.

11. The vehicle accessory assembly of claim 1 wherein the bezel is formed from acrylonitrile butadiene styrene.

12. The vehicle accessory assembly of claim 1 wherein the side panel is formed from polypropylene.

13. The vehicle accessory assembly of claim 1 wherein the vehicle accessory subassembly further comprises a trim ring, wherein when the vehicle accessory subassembly is assembled, the trim ring is positioned between the bezel and the vehicle accessory.

14. The vehicle accessory assembly of claim 1 wherein the bezel further comprises an accessory opening for receiving a corresponding vehicle accessory.

15. A vehicle console comprising:
a console housing comprising a side panel having at least one tab extending from a top of the side panel; and
a receptacle subassembly installed in the console housing, the receptacle subassembly comprising:
- a receptacle comprising a side wall and a guide rib extending from the side wall in a direction away from a center of the receptacle, the guide rib comprising a guide portion having a free end, wherein a guide angle between the guide portion and the side wall is less than about 90°; and
- a bezel in which the receptacle is installed, the bezel comprising a body portion, a perimeter wall extending from an underside of the body portion, an upper engagement portion extending in an inboard direction from an inboard side of the perimeter wall, a snap portion, at least a portion of which is spaced apart from the upper engagement portion by a receiving slot, and an opening shaped to correspond to the receptacle, wherein the free end of the guide portion of the receptacle is outboard of the snap when the receptacle and the bezel are assembled as the receptacle subassembly, wherein, as the receptacle subassembly is installed on the console housing, the tab of the side panel engages the guide portion of the guide rib such that the guide portion of the guide rib guides the tab over an outboard side of the snap portion and into engagement with the receiving slot of the bezel.

16. The vehicle console of claim 15 wherein the guide angle is about 45°.

17. A method of assembling a vehicle accessory assembly comprising:
providing a housing comprising a side panel having at least one tab extending from a top of the side panel;
providing a vehicle accessory subassembly comprising:
- a vehicle accessory comprising a side wall and a guide rib extending from the side wall in a direction away from a center of the accessory, the guide rib comprising a guide portion, wherein a guide angle between the guide portion and the side wall is less than about 90°; and
- a bezel in which the vehicle accessory is installed, the bezel comprising a body portion, a perimeter wall extending from an underside of the body portion, an upper engagement portion extending in an inboard direction from an inboard side of the perimeter wall, and a snap portion, at least a portion of which is spaced apart from the upper engagement portion by a receiving slot wherein a free end of the guide portion of the vehicle accessory is outboard of the snap portion of the bezel when the vehicle accessory and the bezel are assembled as the vehicle accessory subassembly;

positioning the vehicle accessory subassembly over the housing;
engaging the tab of the side panel with the guide portion of the vehicle accessory; and
applying force to the vehicle accessory subassembly such that the guide portion of the vehicle accessory guides the tab over an outboard side of the snap portion and into engagement with the receiving slot of the bezel.

18. The method of claim 17 wherein the vehicle accessory assembly is a console and the vehicle accessory is a receptacle.

19. The method of claim 17 wherein guide angle is about 45°.

* * * * *